Figure 1:
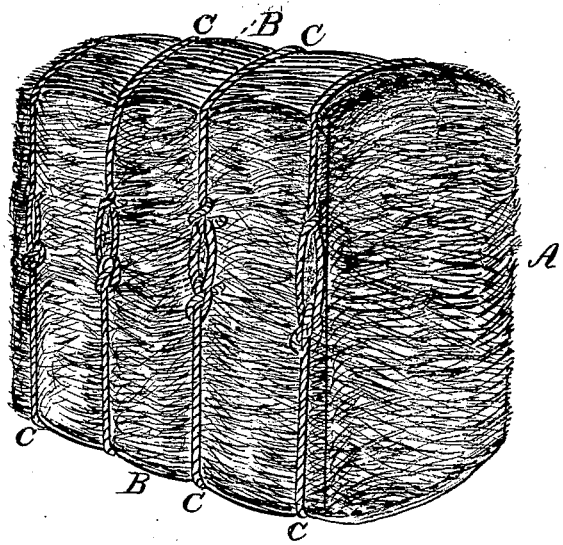

C. Brown,
Baling Short Cut Hay &c.,

No. 68,282. Patented Aug. 27, 1867.

Witnesses
B. H. Muehle
E. B. Forbush.

Inventor
Charles Brown

UNITED STATES PATENT OFFICE.

CHARLES BROWN, OF BUFFALO, NEW YORK.

IMPROVEMENT IN BALING SHORT-CUT HAY, &c.

Specification forming part of Letters Patent No. 68,282, dated August 27, 1867.

*To all whom it may concern:*

Be it known that I, CHARLES BROWN, of the city of Buffalo, county of Erie, and State of New York, have invented Putting up Short-Cut Hay and Straw in Compact Bales, as a new article of manufacture and commerce; and I do hereby declare that the following is a full and exact description, thereof, reference being had to the accompanying drawings, making a part of this specification, in which—

Figure 1 is a perspective view of a bale of short-cut hay made according to the principle of my improvement.

The nature of my invention consists in pressing and binding short-cut hay and straw into compact bales of convenient size and weight for handling, transportation, and use for feed for horses and cattle.

Having reference to the accompanying drawings, A represents a bale of short-cut hay, put up, or cut, pressed, and bound, ready for handling, transportation sale, and use, according to the principle of my invention. From several years' experience I have ascertained that hay and straw, for the purposes of feed for horses and cattle, should be cut into lengths not less than one and one-quarter, and not to exceed one and one-half, inch. When the hay is thus cut, a sufficient quantity of it is put into a suitable press to make a bale of the required size. A layer of long straw or hay (represented at B) is first laid on the bottom of the press, and the short-cut hay upon the straw, and another layer of long straw or hay, B, placed on the top of the cut hay in the press. Great pressure is then applied by means of the press, which will bring it into the compact form required. The straw or hay as a binder, used on the top and bottom of the bale, is preferable to wooden slats or the like, as the straw answers the purpose equally as well, and is as valuable, or nearly so, as the hay itself. Convenient grooves are made in the press for the insertion of cords, bands, or hoops around the bale, so that the ends may be strongly tied or fastened before the pressure is removed. In the drawing, cords are represented at C. Hoops may be used instead of the cords, and for cheapness and strength in common use I prefer wooden hoops. The layers of straw serve as a covering and binder to hold the short hay in the bale. For convenient handling and transportation, the bales should be made from one hundred to three hundred pounds in weight.

It is well known that horses and cattle thrive better on cut hay, or "chop feed," as it is sometimes called, than they do upon long and uncut hay, and it has been a matter of a good deal of labor and expense for keepers of horses and cattle to provide themselves with cut hay, especially so to those who depend upon buying and transportation.

My invention enables me to overcome these difficulties, and to put short-cut hay into the market as an article of trade and commerce. Cut hay in bales can be more easily, cheaply, and readily transported, and with less waste, than long and uncut hay, and hence my improvement enables me to put such bales into the market as a new article of trade and manufacture, and to furnish people residing in cities, towns, and distant places with a much-needed and useful article.

In practice I carry up the cut hay by an elevator, at some considerable distance above the press, and let it fall through a slight current of air into the press, so that the fine dust, dirt, and foreign particles will be carried off by the air, leaving the hay clean and freed therefrom. The fine dust and dirt which are commonly found in hay are very injurious to horses, giving them a cough, heaves, and lung complaints. This evil is remedied by winnowing the cut hay, as above described.

What I claim as my invention, and desire to secure by Letters Patent, is—

1. Pressing and binding short-cut hay and straw into compact bales, as a new article of manufacture, trade, and commerce, substantially as described.

2. The application and use of straw or hay as a binder on the top and bottom of the bale, substantially as set forth.

CHARLES BROWN.

Witnesses:
  B. H. MUEHLE,
  E. B. FORBUSH.